3,119,720
POLYOLEFIN REMOVAL METHOD
Claude J. Stiles and James W. Biggs, Tuscola, Ill., assignors to National Distillers and Chemical Corporation, New York, N.Y., a corporation of Virginia
No Drawing. Filed June 21, 1962, Ser. No. 204,030
23 Claims. (Cl. 134—22)

This invention relates to a method for removing resin of a thermoplastic nature and accompanying degradation products from metal surfaces and also to a novel composition of matter used in one of the steps thereof. The thermoplastic resin may be the polyolefins, such as polyethylene and polypropylene, and the various co-polymers of ethylene or propylene with olefinic compounds having 4 to 20 carbon atoms as well as with other unsaturated organic monomers such as butene-1, butene-2, isobutylene methyl acrylate, vinyl acetate, etc.

This invention is particularly adaptable to cleaning metal equipment, especially extrusion apparatus, which has come in contact with molten polyethylene resin or molten olefinic co-polymers whose major constituent is polyethylene, although the process is also applicable to the similar cleaning of mixers, injection molding units, laminating devices, and the like.

For the convenience of the description of the invention herein will be directed primarily to the case of polyethylene, although it will be understood that the method disclosed is applicable as well to the broader class of polyolefins as aforementioned.

The cleaning of molten polyethylene processing equipment, particularly extruders, has presented a serious problem to the industry because of the resin's tenacious adherence to metals used in extruder construction, such as carbon steels, stainless steels and chrome-plated steels. Moreover, at the elevated temperatures used during extrusion, usually from about 250° F. to 550° F., polyethylene is subject to significant oxidation. The resulting degradation products build up to an intolerable level within the machine during the continued or prolonged extrusion with the result that the extruded product becomes contaminated and shutdown of the equipment is required. The extreme conditions of extruder operations also cause the oxidation of the internal metal surfaces of the extruder and subsequent contamination of the polyethylene extrudate by metallic oxides. It is required therefore, that extruders be cleaned periodically to prevent the production of large amounts of off-specification and reject material.

In commercial operations it is also necessary to clean out the extruder when changing from the processing of one grade of resin to another to avoid contamination of the new product. The problem is aggravated when switching from the extrusion of colored polyethylene to that of another color or to uncolored resin. One conventional method used to avoid contamination due to these changes in resin types is to thoroughly flush out the old plastic with the new grade. Besides being time consuming and wasteful of the resin, this purge treatment has little effect in removing the oxidation products from the interior metal surfaces of the extruder.

Other methods previously employed for cleaning extruders involve contacting the contaminated surfaces with boiling solvent for the polyethylene resin or scraping the metal surfaces with a ductile-metal tool followed by scouring with copper or brass wool. Both of these methods require the dismantling of the extruder apparatus and are therefore time consuming and expensive.

A recently developed method, disclosed in the U.S. Patent No. 2,744,841, for removing polyethylene resin from metal surfaces entails contacting said surfaces with pentaerythritol at a temperature above the softening point of the polyethylene. It is believed that the pentaerythritol coats the molten polyethylene, thereby precluding its adherence to the metal and allowing withdrawal of the coated resin from the surface. In testing the utility of this technique under industrial conditions, certain problems become apparent. It was found that after charging granular pentaerythritol to the feed hoppers of polyethylene-and-oxide-coated plant extruders and initiating the extrusion operation at temperatures from about 350° to 400° F., the pentaerythritol soon solidified in the void spaces within the extruder barrel. In approximately 10 minutes the machine was clogged and would not extrude the pentaerythritol. Moreover, after disassembling the apparatus, inspection showed that in cases of severe, or even moderate oxidation, the extruder screw had not been cleaned satisfactorily. Also pentaerythritol adhered to the metal surfaces as rigidly as the oxidized polymer, thus further contaminating the processing equipment.

It is a primary object of this invention to provide an improved method of cleaning polyolefin extrusion and/or processing equipment.

Another object of this invention is to devise a method for removing adhered polyethylene resin, oxidized polyethylene, and metallic oxides from the interior metal surfaces of extruding apparatus and the like without the requirement of dismantling such equipment.

It is a further object to provide a novel cleaning composition for removing such oxides and the residue of preliminary cleaning agents from extruders.

Although the invention primarily described herein with respect to the cleaning of extruders, it is contemplated that the process may be used to treat any of the various devices and machines of metallic construction employed in handling molten polyolefin resins.

In general, these objects and other objects of this invention are accomplished by a multi-step process which comprises:

(1) The extrusion through the resin- and oxide-contaminated machine of either pentaerythritol or, preferably, a mixture of pentaerythritol and polyethylene. This operation is performed at a temperature above the softening point of the polyethylene and below the melting point of the pentaerythritol;

(2) The extrusion at a temperature within the same range of a unique mixture comprising in combination (a) an alkali metal hydroxide and/or an alkali metal carbonate, (b) an organic or inorganic sequestering agent, and (c) a polyethylene resin;

(3) the removal of the residue from the preceding cleaning step. This is accomplished by any convenient means, for example, by the extrusion of polyethylene containing small amounts of water at a temperature that need be no higher than just above the softening point of the resin. This final cleaning could also be accomplished by means of an adequate water flush, but this procedure is less efficient.

The term "softening point" of polyethylene resin, referred to herein, may be taken as interchangeable with the term "melting point" and pertains to the temperature at which the polymer has lost all of its crystallinity and has become completely amorphous. The melt index figure describes the flow behaviour of a polyethylene resin at a specified temperature and under specified pressure. It is determined (ASTM test method DI 238–57T) by measuring the weight of the melted resin in grams which is extruded in ten minutes through an orifice 0.0825 inch in diameter by 0.315 inch long under a pressure of 43.1 p.s.i. at 374° F.

In accordance with the present invention, it has now been discovered that in effecting the removal of adhered resin from extruder metal surfaces a mixture comprising from about 25 to about 30 weight percent of pentaerythritol and from about 70 to about 75 weight percent of solid polyethylene, such as, for example, in the form of small pellets or cubes, can be extruded continuously at a temperature above the softening point of the polyethylene and below the melting point of pentaerythritol. Under these conditions the extrusion of the mixture can be sustained for prolonged periods without "choke down" and resultant inoperability of the extruder apparatus. The duration of the treatment depends, of course, on the extent of contamination, but generally from about 45 to about 60 minutes are sufficient. The most satisfactory mixture, taking into account both cleaning efficiency and processability, contains about 25% of pentaerythritol and about 75% of polyethylene. As an economy measure, the accumulated extrudate can be granulated and used again in the cleaning cycle until its effectiveness is appreciably diminished. As high as five recycles have been carried out successfully.

The pentaerythritol-resin contacting technique for removing polyethylene from metal surfaces is deficient in certain respects when used alone. Firstly, consummate removal of adhered organic and metallic oxides is not affected. It has also been noted, upon inspection of extruders which have been in operation for about a month and have undergone the pentaerythritol-polyethylene treatment one or more times, that pentaerythritol sticks to the screws, barrels, screen packs and other contacting internal surfaces of the machine. If this adhered material is not removed in some way, it tends to gradually flake off during operations and contaminate the extruded product resins.

It has been found that substantially complete cleaning of the extruder is achieved by following the extrusion of the pentaerythritol-polyethylene mixture with a second step, the extrusion of a blend of novel composition, termed for convenience hereinafter as the alkali-sequestering agent-resin mixture. This mixture comprises in combination (1) a major portion of polyethylene resin; (2) a minor portion of an alkali metal hydroxide and/or alkali metal carbonate; and (3) a minor portion of a sequestering agent, preferably an organic sequestering agent. The combination may also contain small amounts of other additives such as wetting agents, antioxidants, and chelating agents. This unique cleaning mixture may be compounded by dry-blending the components in divided solids form in any suitable mixing apparatus.

The extrusion is performed at a temperature above the melting point of the polyethylene, generally about 250° F., and below the melting point of pentaerythritol. Although this upper limiting temperature is about 500° F. due to the relative instability of polyethylene resin at elevated temperatures. The preferred temperature range is from about 350° to 400° F. for polyethylene. In the case of other polyolefins and co-polymers, the lower limiting operating temperature is obviously dependent on that polyolefin's particular melting point, for instance with polypropylene the minimum temperature is approximately 330° F. In all cases the upper limiting temperature is about 500° F.

The extrusion is continued until it is ascertained, by visual inspection of the extrudate, that colored oxidized material is no longer being discharged from the machine. Depending on the condition of the apparatus, the cleaning period may be from about 150 to 180 minutes. The blended extrudate recovered from this step may also be granulated or pelletized and reused.

During the extrusion described above the alkali-sequestering agent-polyolefin resin mixture reacts quite vigorously with residual pentaerythritol in the apparatus whereby some water is formed which, because of the heat, becomes steam. The reaction energy release and accompanying increase in vapor pressure tend to force the extrudate from the barrel in a rather violent manner. The mechanisms causing the interaction between the components in the extruder is not fully known but their contact therein causes residual pentaerythritol, oxidized polyethylene, and metallic oxides to be removed from the metal surfaces and discharged with the extrudate.

In the following description of the alkali-sequestering agent-resin composition all concentrations are given in weight percents. The composition contains a major portion of polyethylene resin, about 85 to 95%, and preferably about 90%. If the polyethylene content is too low and the active ingredients content correspondingly high, the reaction with pentaerythritol in the extruder is so rapid and violent that the efficacy of the cleaning action is significantly decreased.

The alkali constituent is presented in a minor portion, usually in the range of about 4 to 22%, and preferably about 13 to about 17%. This alkali constituent may be an alkali metal hydroxide, an alkali metal carbonate, or a mixture of both the hydroxide and carbonate in any desired proportion. The preferred alkalies are sodium hydroxide, sodium carbonate, potassium hydroxide, and potassium carbonate, and mixtures thereof. It is evident that as the ratio of hydroxide to carbonate is increased, the alkalinity or strength is correspondingly increased, resulting in more vigorous cleaning action; thus it is possible to vary the intensity of reaction by varying this ratio. The alkalies may be used in any convenient divided solids form, such as flakes, granules, crystals, etc.

The sequestering agent in the mixture is also present in a minor amount, generally in the range of about 0.75 to 4%; the preferred concentration is from about 1.5 to about 3%. The sequestering agent may be inorganic, more specifically the alkali metal phosphates and especially such compounds as sodium metaphosphate, $NaPO_3$, the multiple forms, derivatives, varieties and mixtures thereof, for example, sodium dimetaphosphate, sodium trimetaphosphate, sodium tetrametaphosphate, sodium hexametaphosphate, and the like. The more efficient and desirable sequestering agent however, is the organic type: (1) amino polycarboxylic acids, such as ethylenediaminetriacetic acid, (hydroxyethyl) ethylenediaminetriacetic acid, and the like; (2) hydroxy carboxylic acids, such as gluconic acid and citric acid, tartaric acid, saccharic acid, and the like; and (3) the alkali metal salts, preferably of sodium and potassium of the aforementioned acids. The alkali metal salts are superior to their parent acids because of the higher melting points of the salts and because some of the alkali constituent in the ultimate mixture is necessarily utilized to convert the acids to the salts when reaction is initiated in the extruder. More specifically, the most desirable organic sequestering agents are the alkali metal salts of the named hydroxy carboxylic acids. The preferred salts are sodium gluconate and trisodium citrate.

In accordance with the practice of this invention, the alkali-organic sequestering agent-polyethylene extrusion step is followed by an operation to remove any residues remaining therefrom. This may be accomplished by a water flush sufficient to solubilize the alkali and organic sequestering agent constituents. If desired, a further purge by the extrusion of virgin polyethylene may be employed to ensure removal of all traces of water and very small amounts of residual polyethylene. It has been discovered that small amounts of material, especially the alkali and sequestering agent, that might adhere to the interior surfaces of the extruder, particularly to the screw, are best removed by the extrusion of a mixture consisting of polyethylene resin and a small amount of water. The extrusion temperature is preferably at the minimum point above the softening temperature of the polyethylene needed to give the material adequate workability, e.g., from about 325° to 350° F., depending on the physical properties of the resin. Higher temperatures may be used but might cause undesirable oxidation. The mixture may contain approximately 1.0 to 3.0% of water, based on the weight of the polyethylene; the preferred mixture contains from about 1.5 to 2.0% of water based on the weight of the polyethylene. In these final purging techniques it has been found to be advantageous to sometimes employ the same resin scheduled for subsequent operations in the machine in order to avoid the possibility of leaving small amounts of the purge polymer therein.

In accordance with another feature of this invention, the method of cleaning molten polyolefin processing equipment may be carried out with somewhat greater continuity of operation. With reference to extruder cleaning wherein polyethylene is the illustrative polyolefin such a method comprises:

(1) The substantially continuous extrusion of virgin polyethylene resin during the whole of the cleaning period at a temperature above the softening point of the resin and below the melting point of pentaerythritol, such temperature generally lying in the range of about 250° to 500° F., preferably about 350° to 400° F.;

(2) Adding to the polyethylene in the feed zone of the extruder a regulated amount of pentaerythritol so that the resulting mixture entering into the extrusion zone contains a minor portion of pentaerythritol, about 25 to 35 weight percent, preferably about 30%. This addition is continued until essentially all old resin adhering to the internal metal surfaces is removed, and usually requires from at least about 45 minutes, and preferably about 45 to 60 minutes.

(3) Then adding to the polyethylene in the feed zone minor portions of an alkali and a sequestering agent, the subsequent feed mixture preferentially containing approximately 4 to 22% alkali and 0.75 to 4% sequestering agent, reference being had to the previous descriptions of these materials. This addition is continued until by visual inspection and observance of the color of the extrudate it is ascertained that complete removal of oxygenated substances and residual pentaerythritol is accomplished; the period is usually from at least about 45 minutes, and preferably about 45 to 60 minutes, depending on the machine's initial condition.

(4) Thereafter adding to the feed polyethylene a minor portion of water, which may be approximately 1.0 to 3.0% of the resin by weight, preferably about 1.5 to 2.0%, for a period sufficient to ensure removal of residual alkali and sequestering agent, normally from about 15 to 20 minutes.

If not already employed, polyethylene resin of the specific type, grade and color to be next commercially processed in the extruder may then be introduced to the feed zone as an additional precaution against product contamination.

The invention will be more fully understood by reference to the following illustrative embodiment.

*Example*

A contaminated, screw-type plant extruder, 12 inches in diameter and 12 feet long, equipped with a 10 inch die, was subjected to the extrusion of a mixture containing 70 weight percent of polyethylene (with a melt index range of 3 to 5 grams/10 minutes and a melting point of 220° F.) and 30 weight percent of pentaerythritol for about 30 minutes with a screw speed of 40 r.p.m. at a temperature of 350 to 370° F. Subsequent examination of the extruder internal parts, which could be visually inspected, showed that pentaerythritol, oxidized polyethylene and metallic oxides were stuck to such parts, especially to the screw which had a dark-brown oxidized appearance. A mixture composed of approximately 90% polyethylene resin (same grade as above), 7.5% sodium hydroxide, 1.0% sodium carbonate, and 1.5% sodium gluconate was then extruded for about 30 minutes at 350° to 370° F. The color of the extrudate, initially containing dark brown residues, gradually lightened as the extrusion progressed. At the completion of this step, all internal parts of the extruder which could be visually inspected had a bright, shiny clean appearance except for small amounts of adhered alkali and sodium gluconate. These contaminants were removed by extruding polyethylene resin (same grade as above) containing about 2% of water, based on the weight of the polyethylene, for about 10 minutes at 350° to 370° F.

While certain embodiments of the invention have been presented above, it will be understood that the invention is obviously subject to variations and modifications without departing from its broader scope.

What is claimed is:

1. A method of removing contaminating substances from the metal surfaces of molten polyolefin processing equipment comprising the steps of:

(a) contacting said surfaces with a mixture comprising from about 70 to about 75 weight percent of a polyolefin and from about 25 to about 30 weight percent of pentaerythritol at a temperature above the softening point of the polyolefin and below the melting point of pentaerythritol and withdrawing said mixture from said surfaces;

(b) contacting said surfaces with a mixture comprising in combination (1) a major portion of the polyolefin, (2) a minor portion of an alkali from the group consisting of sodium hydroxide, sodium carbonate, potassium hydroxide, potassium carbonate, and mixtures thereof, and (3) a minor portion of a sequestering agent at a temperature above the softening point of the polyolefin and below the melting point of pentaerythritol and withdrawing said mixture from said surfaces;

(c) contacting said surfaces with a mixture consisting of a major portion of the polyolefin and a minor portion of water at a temperature above the softening point of the polyolefin and withdrawing said mixture from said surfaces.

2. A method according to claim 1 wherein the polyolefin is polyethylene.

3. A method according to claim 1 wherein the polyolefin is polypropylene.

4. A method according to claim 1 wherein the contacting temperatures are from about 250° to about 500° F.

5. The method of claim 1 wherein the polyolefin is a co-polymer of ethylene with an olefin from the group consisting of propylene, butene-1, butene-2, and isobutylene.

6. The method of claim 1 wherein the contacting mixture of step (b) comprises approximately 85 to 95 weight percent of the polyolefin, approximately 4 to 22 percent of the alkali and approximately 0.75 to 4 percent of the sequestering agent.

7. The method according to claim 1 wherein the sequestering agent is an alkali metal phosphate.

8. The method of claim 7 wherein said sequestering agent is a derivative of sodium metaphosphate.

9. The method according to claim 1 wherein the sequestering agent is an organic compound from the group consisting of aminopolycarboxylic acid, hydroxycarboxylic acids and the sodium and potassium salts thereof.

10. The method of claim 9 wherein the sequestering agent is ethylenediaminetriacetic acid.

11. The method of claim 9 wherein the sequestering agent is sodium gluconate.

12. The method of claim 9 wherein the sequestering agent is trisodium citrate.

13. A method of removing adhered thermoplastic polyolefin resin, oxidized polyolefin resin, and metallic oxides from the interior metal surfaces of a polyolefin extrusion apparatus which comprises:

(a) the substantially continuous extrusion of polyolefin resin at a temperature above the softening point of the polyolefin and below the melting point of pentaerythritol;

(b) adding to the polyolefin in the feed zone of said extruder a minor portion of pentaerythritol for a period sufficient for removal of the adhered resin from the metal surfaces;

(c) adding to the polyolefin in the feed zone of said extruder minor portions of a sequestering agent and an alkali from the group consisting of sodium hydroxide, sodium carbonate, potassium hydroxide, potassium carbonate, and mixtures thereof for a period sufficient for removal of adhered oxides from said surfaces;

(d) adding to the polyolefin in the feed zone of said extruder a minor portion of water for a period sufficient for removal of residues from step (c) and then discontinuing the extrusion.

14. A method according to claim 13 wherein the polyolefin is polyethylene.

15. A method according to claim 13 wherein the polyolefin is polypropylene.

16. The method according to claim 13 wherein the extrusion temperature is from about 250° to about 500° F.

17. The method of claim 13 wherein the polyolefin is a co-polymer of ethylene with an olefin from the group consisting of propylene, butene-1, butene-2, and isobutylene.

18. A composition of matter for removing adhered pentaerythritol, oxidized polyolefin resin, and metallic oxides from the metal surfaces of molten polyolefin processing equipment comprising in combination a mixture of:

(a) a major amount of at least 85 weight percent of a thermoplastic polyolefin resin;

(b) a minor amount of at least 4 weight percent of an alkali from the group consisting of sodium hydroxide, sodium carbonate, potassium hydroxide, potassium carbonate, and mixtures thereof;

(c) a minor amount of at least 0.75 weight percent of a sequestering agent.

19. The composition of claim 18 wherein the concentrations are approximately 85 to 95 weight percent of the polyolefin, 4 to 22 weight percent of the alkali and 0.75 to 4 wt. percent of the sequestering agent.

20. The composition of claim 18 wherein the sequestering agent is an alkali metal phosphate.

21. The composition of claim 18 wherein the sequestering agent is an organic compound from the group consisting of amino polycarboxylic acids, hydroxy carboxylic acids, and the sodium and potassium salts thereof.

22. The composition of claim 18 wherein the sequestering agent is sodium gluconate.

23. The composition of claim 18 wherein the sequestering agent is trisodium citrate.

References Cited in the file of this patent

UNITED STATES PATENTS

| | | |
|---|---|---|
| 2,744,841 | Cassis et al. | May 8, 1956 |
| 2,779,696 | Rutherford | Jan. 29, 1957 |
| 2,786,047 | Jones et al. | Mar. 19, 1957 |
| 2,917,418 | Cathcart | Dec. 15, 1959 |
| 2,962,395 | Brown | Nov. 29, 1960 |
| 3,010,852 | Prange | Nov. 28, 1961 |
| 3,012,003 | Speyer | Dec. 5, 1961 |